(12) United States Patent
Holmquist et al.

(10) Patent No.: US 6,490,122 B1
(45) Date of Patent: Dec. 3, 2002

(54) SYSTEM AND METHOD FOR PROVIDING POWER AND CONTROL SIGNALS TO A CARTRIDGE ACCESS DEVICE IN A CARTRIDGE STORAGE SYSTEM

(75) Inventors: Thomas W. Holmquist, Fort Collins, CO (US); Gregg S. Schmidtke, Fort Collins, CO (US); Kelly J. Reasoner, Fort Collins, CO (US); Ronald L. Ehrlich, Greeley, CO (US); Robert L. Mueller, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/143,208

(22) Filed: Aug. 28, 1998

(51) Int. Cl.$^7$ ............................................. G11B 15/68
(52) U.S. Cl. ....................................................... 360/92
(58) Field of Search .............................. 360/92; 369/36; 414/280; 439/110–122, 207–216

(56) References Cited

U.S. PATENT DOCUMENTS

| | | | | |
|---|---|---|---|---|
| 3,881,053 A | | 4/1975 | Lemelson .................... | 178/6.8 |
| 4,790,766 A | * | 12/1988 | Booty, Sr. et al. ........... | 439/122 |
| 5,303,214 A | | 4/1994 | Kulakowski et al. ......... | 369/34 |
| 5,395,199 A | | 3/1995 | Day, III et al. .............. | 414/267 |
| 5,791,853 A | * | 8/1998 | Danielson et al. ........... | 414/280 |

FOREIGN PATENT DOCUMENTS

| | | | |
|---|---|---|---|
| EP | 0768657 A | 4/1997 | ............ G11B/15/68 |
| WO | WO 96/18997 | 6/1996 | ............ G11B/17/22 |

* cited by examiner

Primary Examiner—George J. Letscher

(57) ABSTRACT

A cartridge access device in a cartridge storage system is designed to retrieve a cartridge from a storage device and to transfer the cartridge to a particular location within the system. Once the cartridge is no longer needed at the particular location, the cartridge access device retrieves the cartridge from the particular location and returns the data cartridge to the storage device. The data cartridge device preferably includes at least two engaging members that engage a respective surface of a frame assembly. Channels in the surfaces of the frame assembly guide the engaging members and, therefore, the cartridge access device as the cartridge access device moves. The engaging members are engaged with a respective conductive track member that extends through the channels in the frame assembly. Electrical current is passed through the conductive track members and the engaging members to the cartridge access device in order to supply the cartridge access device with electrical power and/or to communicate control signals to the cartridge access device. Therefore, a power cable and/or a control cable does not have to be physically connected to the cartridge access device in order for the components on the cartridge access device to receive electrical power and/or control signals.

27 Claims, 9 Drawing Sheets

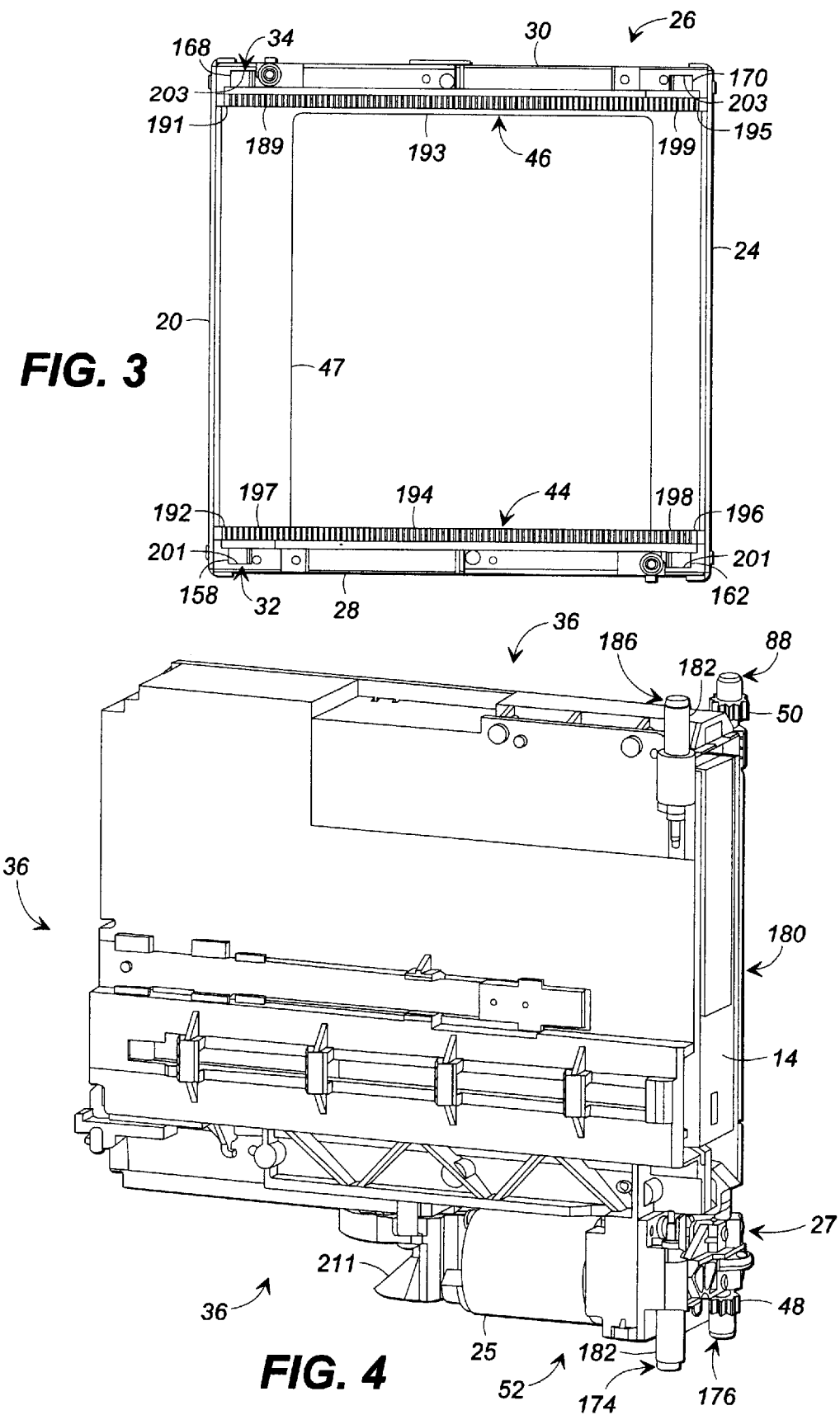

SYSTEM AND METHOD FOR PROVIDING POWER AND CONTROL SIGNALS TO A CARTRIDGE ACCESS DEVICE IN A CARTRIDGE STORAGE SYSTEM

BACKGROUND OF THE INVENTION

1. Field of Invention

The present invention relates generally to cartridge storage systems for handling and storing cartridges, such as optical disk or magnetic tape cartridges, and more specifically, to a system and method for supplying power and control signals to a movable device (i.e., a cartridge access device) that stores and retrieves cartridges in a cartridge storage system.

2. Related Art

Many different types of cartridge storage and handling systems exist and are being used to store data cartridges (and other types of cartridges) at known locations and to retrieve desired cartridges so that data may be written to and/or read from the data cartridges. Such data storage and handling systems are often referred to as "autochangers" or "juke box" data storage systems, particularly if they accommodate a large number of individual data cartridges.

A typical juke box data storage system includes one or more different types of cartridge-receiving devices for holding the various data cartridges. For example, one type of cartridge-receiving device may comprise a cartridge storage rack or "magazine" while another type of cartridge-receiving device may comprise a cartridge read/write device. The cartridge storage racks or magazines serve to provide storage locations for the data cartridges and are commonly arranged so that they form one or more vertical stacks. The cartridge read/write device may be located adjacent the cartridge stack, although the cartridge read/write device can be positioned at any convenient location. The data storage system may also include a cartridge access device for accessing the various data cartridges contained in the cartridge-receiving devices and a positioning device for moving the cartridge access device among the cartridge-receiving devices.

If a host computer system issues a request for data contained on a particular data cartridge, a control system associated with the cartridge access device actuates the positioning system to move the cartridge access device along the cartridge storage rack until the cartridge access device is positioned adjacent the desired data cartridge. The cartridge access device then removes the data cartridge from the cartridge storage rack and carries it to the cartridge read/write device. The cartridge access device inserts the selected data cartridge into the cartridge read/write device so that the host computer may thereafter read data from or write data to the data cartridge. After the read/write operation is complete, the cartridge access device removes the data cartridge from the read/write device and returns it to a specified location in the cartridge storage rack.

Most cartridge access devices have components that require both power and control signals. For example, the positioning system that moves the cartridge access device to the appropriate location usually requires power and control signals in order to appropriately move the cartridge access device.

A simple technique for providing the power and control signals to the cartridge access device is to connect a power cable and a control cable to the cartridge access device, as is commonly done in the prior art. The power cable supplies the components of the cartridge access device with power, and the control cable provides the cartridge access device with control signals for proper operation. Both the power cable and the control cable can be. tied together or integrated into a single cable.

However, if the cables are not properly secured, the cables can interfere with the motion of the cartridge access device. For example, the cables can block the path of movement of the cartridge access device causing the cartridge access device to malfunction or jam. Alternatively, the cables can wrap around the cartridge access device as the cartridge access device moves in different directions thereby impeding the motion of the cartridge access device or interfering with the retrieval of the data cartridge.

Furthermore, having a cable coupled to the moving cartridge access device can make it more difficult to manufacture and service the data storage system. In this regard, the cable can interfere with efforts to install, remove, and access the cartridge access device and other components in the system. In addition, communicating signals through the cable can adversely emit radio frequency interference (RIF) from the cable. Other problems associated with having a cable coupled to a moving cartridge access device should be apparent to one ordinarily skilled in the art.

Thus, a heretofore unaddressed need exists in the industry for a system and method of providing power and/or control signals to a movable cartridge access device within a data storage system without disrupting the motion of the cartridge access device.

SUMMARY OF THE INVENTION

The present invention overcomes the inadequacies and deficiencies of the prior art as discussed herein. Generally described, the present invention provides a system and method for providing power and control signals to a movable device that retrieves and stores cartridges within a cartridge storage system without connecting a power cable to the movable device.

The present invention utilizes a frame assembly, an engaging member, a conductive member, and a cartridge access device. The frame assembly has a channel or groove. The conductive member is attached to a surface of the frame assembly and extends through the channel of the frame assembly. The cartridge access device receives and transports cartridges from one location within the cartridge storage system to another location within the cartridge storage system. The first engaging member is coupled to the cartridge access device and engaged with the conductive member. The engaging member is conductive so that electrical signals can be passed between the engaging member and the conductive member attached to the frame assembly.

In accordance with another feature of the present invention, the engaging member includes a shaft, a brush, a rod, and a spring. The brush is coupled to the rod which is inserted into a hole in the shaft. The spring is coupled to the rod and engaged with the shaft so that a force generated by the spring tends to push the brush away from the shaft and toward the conductive member. Due to the force generated by the spring, the brush engages the conductive member and maintains contact with the engaging member (i.e., slides across a surface of the engaging member) as the cartridge access device moves.

In accordance with another feature of the present invention, control signals are superimposed on a power signal that is supplied to the cartridge access device via the conductive member and the engaging member. A filter is designed to filter out the power signal from the control signals so that the control signals can be recovered and utilized by the cartridge access device in order to operate the components of the cartridge access device.

The present invention can also be viewed as providing a method for transferring data cartridges within a data storage system. Briefly described, the method can be broadly conceptualized by the following steps: inserting a cartridge associated with the cartridge storage system into a cartridge access device; moving the cartridge access device; sliding a brush coupled to the cartridge access device across a surface of the conductive member during the moving step; and supplying the cartridge access device with electrical power via the brush and the conductive member.

The present invention has many advantages, a few of which are delineated hereafter, as mere examples.

An advantage of the present invention is that electrical power can be supplied to components of a cartridge access device within a data storage system without connecting a power cable to the cartridge access device.

Another advantage of the present invention is that control signals can be supplied to the cartridge access device without connecting a control cable to the cartridge access device.

Another advantage of the present invention is that the cartridge access device can move through the data storage system without interference from a power cable or a control cable.

Another advantage of the present invention is that radio frequency interference (RIF) associated with a cartridge storage system can be reduced.

Another advantage of the present invention is that the cartridge access device with the cartridge storage system can be easier to access and to install.

Other features and advantages of the present invention will become apparent to one skilled in the art upon examination of the following detailed description, when read in conjunction with the accompanying drawings. It is intended that all such features and advantages be included herein within the scope of the present invention, as is defined by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

FIG. 3 is a side view of the frame assembly depicted in FIG. 2;

FIG. 4 is a three-dimensional side view of the cartridge access device depicted in Fig 1;

DETAILED DESCRIPTION OF THE INVENTION

Figure 1:
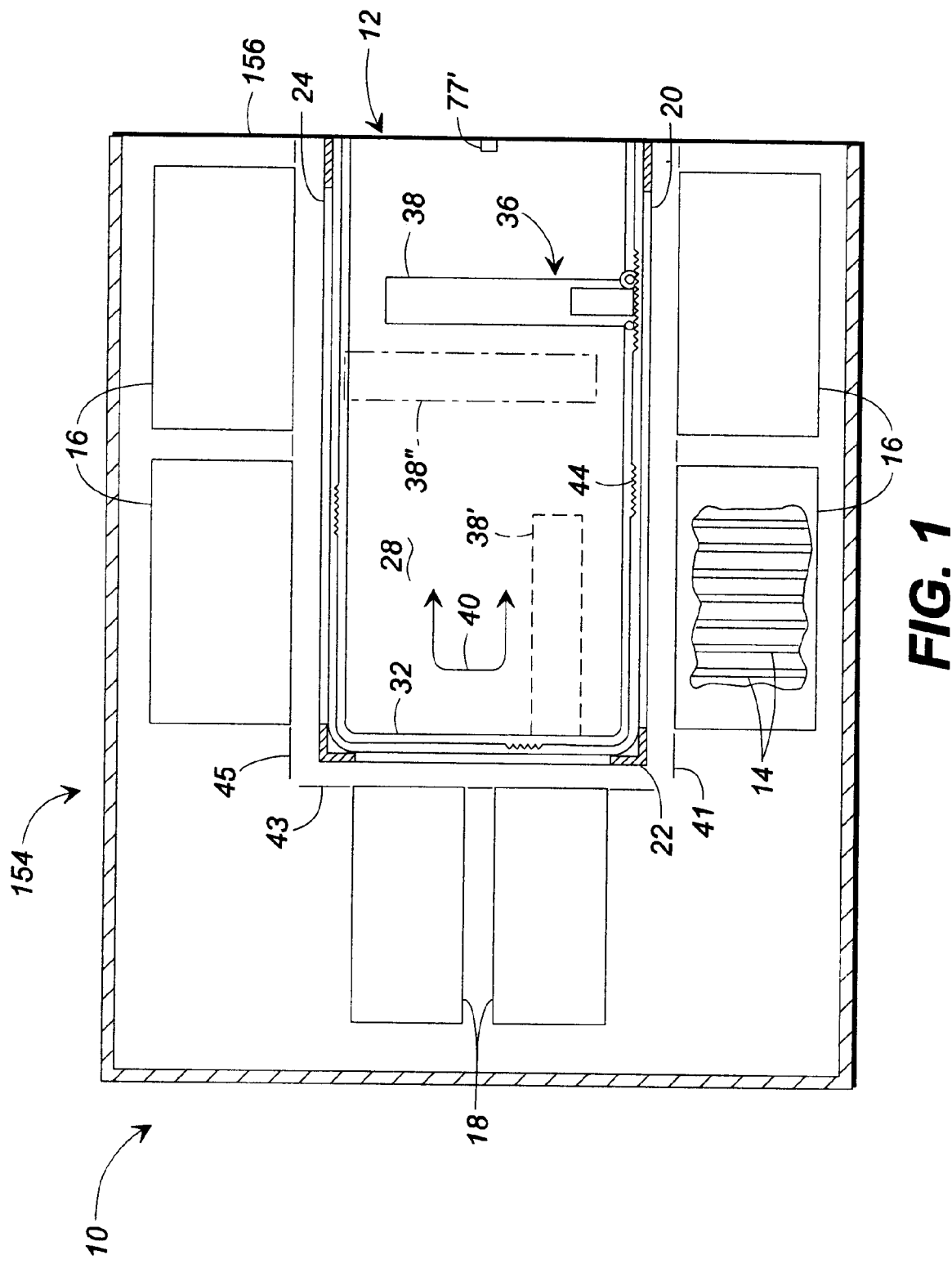
FIG. 1 is a top view of a cartridge storage system according to the present invention showing a cartridge access device in various positions.

A cartridge storage system 10 according to the present invention is shown in FIG. 1 and may include a cartridge handling system 12 for transferring cartridges 14 between one or more cartridge-receiving devices, such as one or more cartridge storage racks or magazines 16 and one or more cartridge read/write devices 18. Although different types of cartridges 14 are possible, the present invention will be described for illustrative purposes where the cartridges 14 are data cartridges. However, the term "cartridge" is not limited to data cartridges and is defined as a movable unit of equipment designed to fit into a larger piece of equipment. For example, the cartridges 14 can comprise a vile of fluid to be transported in a testing laboratory.

Although other configurations are possible, the various cartridge-receiving devices (e.g., the cartridge storage racks or magazines 16 and the cartridge read/write devices 18) may be positioned at various locations around the cartridge handling system 12 so that they define the generally U-shaped configuration shown in FIG. 1. Accordingly, the cartridges 14 may be accessed from three (3) cartridge access planes 41, 43, and 45.

Figure 2:
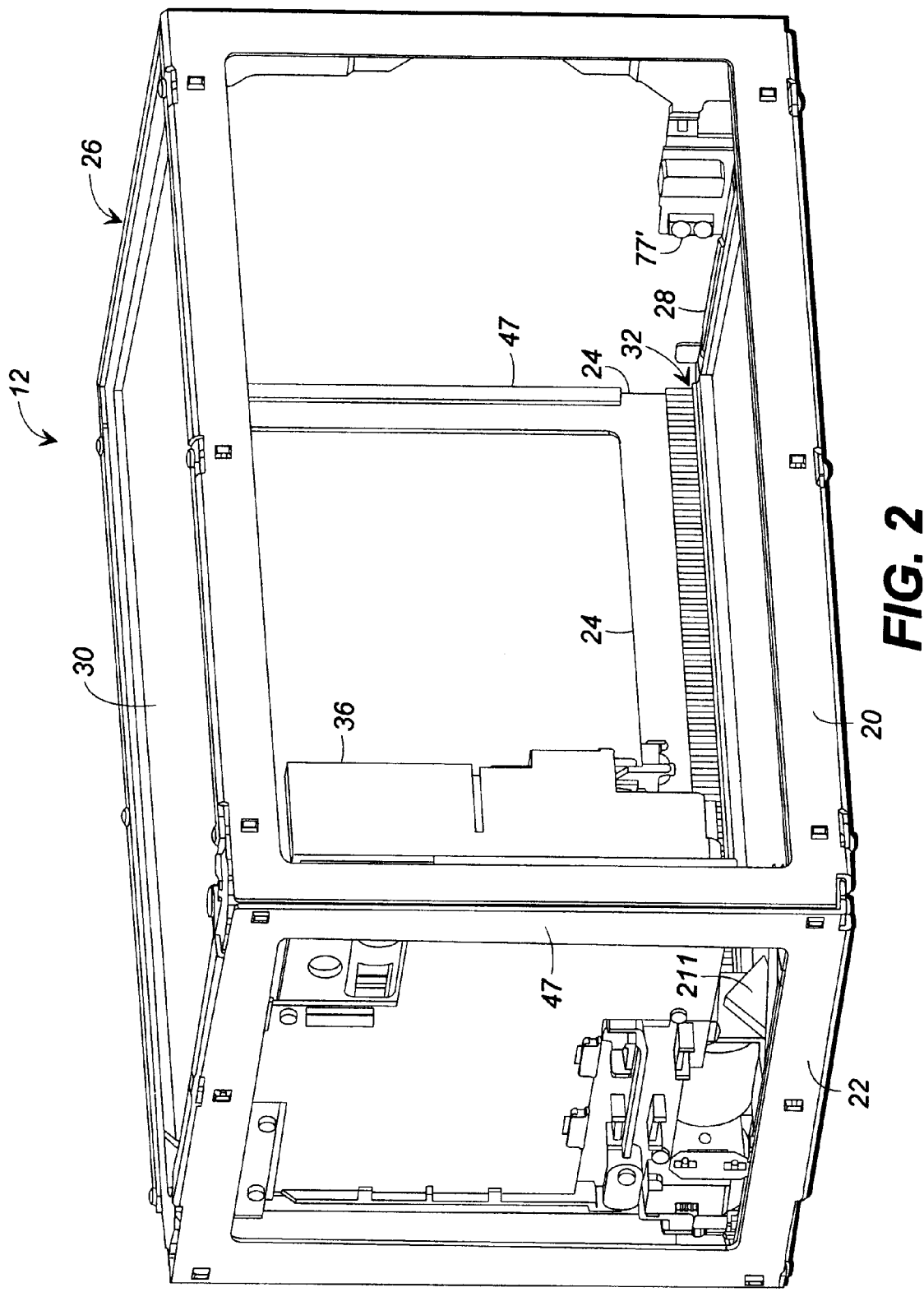
FIG. 2 is a three-dimensional side view of a frame assembly that may be used to house the cartridge access device depicted in FIG. 1.

The cartridge handling system 12 is shown in more detail in FIG. 2 and may comprise a frame assembly 26 which includes a lower or base plate 28 and an upper or top plate 30 that are held in generally parallel, spaced-apart relation by a support structure 47. The frame assembly 26 of the cartridge handling system 12 may define a first cartridge access side 20, a second cartridge access side 22, and a third cartridge access side 24. The first and third cartridge access sides 20 and 24 may be positioned in generally spaced-apart relation, whereas the second cartridge access side 22 may be oriented generally transverse to the first and third cartridge access sides 20 and 24. The various cartridge-receiving devices may be positioned around the cartridge handling system 12 so that the cartridge access planes 41, 43, and 45 (FIG. 1) defined by the cartridge-receiving devices are located adjacent the three cartridge access sides 20, 22, and 24.

The lower plate 28 of frame assembly 26 may include a lower U-shaped guide member or channel 32 that forms a substantially continuous member along the first, second, and third cartridge access sides 20, 22, and 24 of the frame assembly 26. Similarly, the upper plate 30 may include an upper U-shaped guide member or channel 34 (FIG. 3) that also forms a substantially continuous member along the first, second, and third cartridge access sides 20, 22, and 24 of the frame assembly 26.

The cartridge handling system 12 (FIG. 2) may also include a cartridge access device 36 (FIG. 4) capable of loading and retrieving the cartridges 14 (FIG. 1) from the cartridge-receiving devices (e.g., cartridge storage racks 16 and the cartridge read/write devices 18). The cartridge access device 36 engages the upper and lower U-shaped guide members or channels 32 and 34 in the respective lower and upper plates 28 and 30, and is thus guided by the lower and upper guide members 32 and 34 along the first, second, and third cartridge access sides 20, 22, and 24. That is, the cartridge access device 36 moves along a generally U-shaped path 40 (FIG. 1). For example, the cartridge access device 36 may be moved between a first position 38 adjacent the first access side 20 of frame assembly 26, a second position 38' adjacent the second access side 22, and a third position 38" adjacent the third access side 24, as seen in FIG. 1. The cartridge access device 36 may also be moved from a position adjacent the third cartridge access side 24 to positions adjacent either the second cartridge access side 22 or the first cartridge access side 20.

Figure 5:
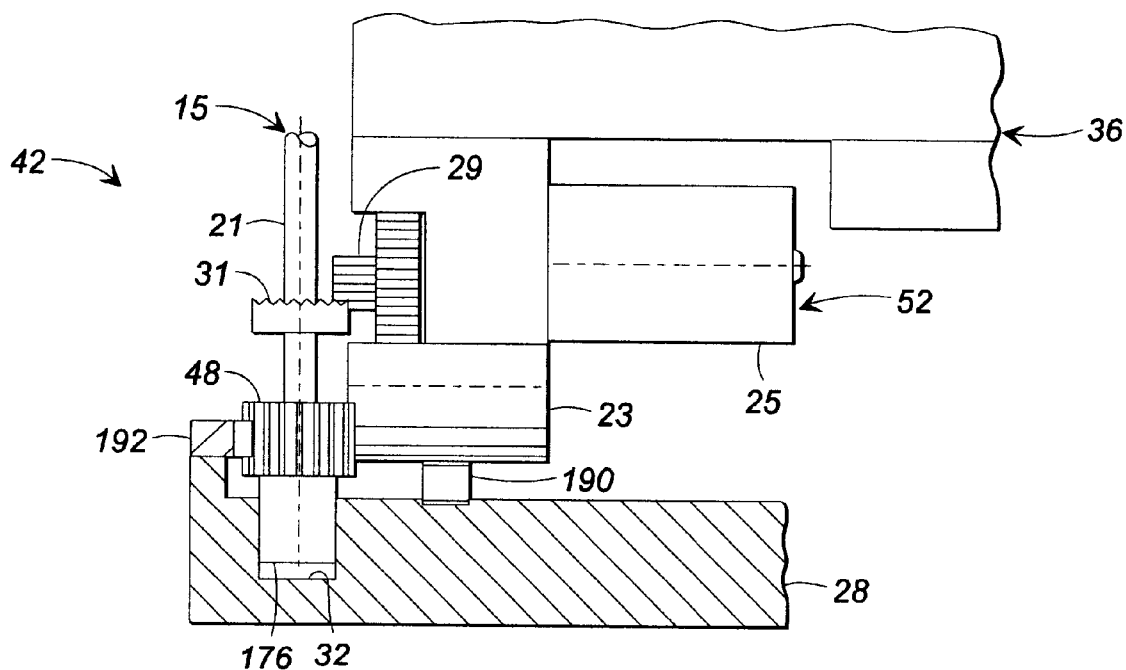
FIG. 5 is an enlarged side view of an actuator system and lower bearing and wheel assembly of the cartridge access device depicted in FIG. 1.
Figure 6:
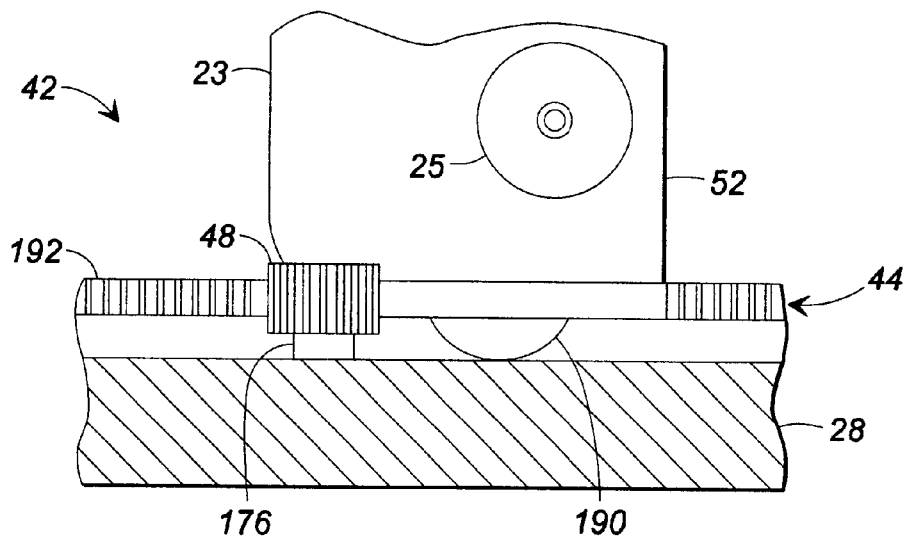
FIG. 6 is an enlarged end view of the actuator system and lower bearing and wheel assembly of FIG. 5.

Although other actuation systems are possible, the cartridge access device 36 is preferably moved along the lower and upper guide members 32 and 34 (i.e., following the U-shaped path 40) by an actuator system 42, as depicted in FIGS. 5 and 6. In one preferred embodiment, the actuator system 42 may comprise a rack and pinion drive system having a substantially continuous lower gear rack 44 provided on the lower plate 28 at a position adjacent the lower U-shaped guide member or channel 32. Accordingly, the lower gear rack 44 defines a substantially continuous, U-shaped member. An upper gear rack 46 (FIG. 3) may be provided on the upper plate 30 at a position adjacent the upper U-shaped guide member or channel 34. The upper gear rack 46 (FIG. 3) also defines a substantially continuous, U-shaped member. Lower and upper drive pinions 48 and 50 (FIG. 4) mounted to the cartridge access device 36 engage the respective lower and upper gear racks 44 and 46. A pinion drive assembly 52 mounted to the cartridge access device 36 rotates the lower and upper pinion gears 48 and 50, thereby moving the cartridge access device 36 back and forth along the lower and upper guide members 32 and 34, following the U-shaped path 40. See FIG. 1.

In operation, the cartridge storage system 10 according to the present invention may be used to transfer a plurality of cartridges 14 between the various cartridge receiving devices (e.g., cartridge storage racks or magazines 16 and the cartridge read/write devices 18) positioned adjacent the first, second, and third cartridge access sides 20, 22, and 24. Therefore, the cartridge storage system 10 may be used by a computer system 53 (FIG. 7), for example, or other data processing system to store and access data contained in the cartridges 14.

In this regard, the computer system 53 preferably includes control logic 54 that determines when data should be stored on or read from a particular cartridge 14. The control logic 54 of the computer system 53 can be implemented in software, hardware, or a combination thereof. In the preferred embodiment, as illustrated by way of example in FIG. 7, the control logic 54 of the present invention along with its associated methodology is implemented in software and stored in computer memory 55 of the computer system 53. Note that the control logic 54 can be stored and transported on any computer-readable medium for use by or in connection with a computer-readable system or method. In the context of this document, a computer-readable medium is an electronic, magnetic, optical, or other physical device or means that can contain or store a computer program for use by or in connection with a computer-related system or method. As an example, the control logic 54 may be magnetically stored and transported on a conventional portable computer diskette.

Figure 7:
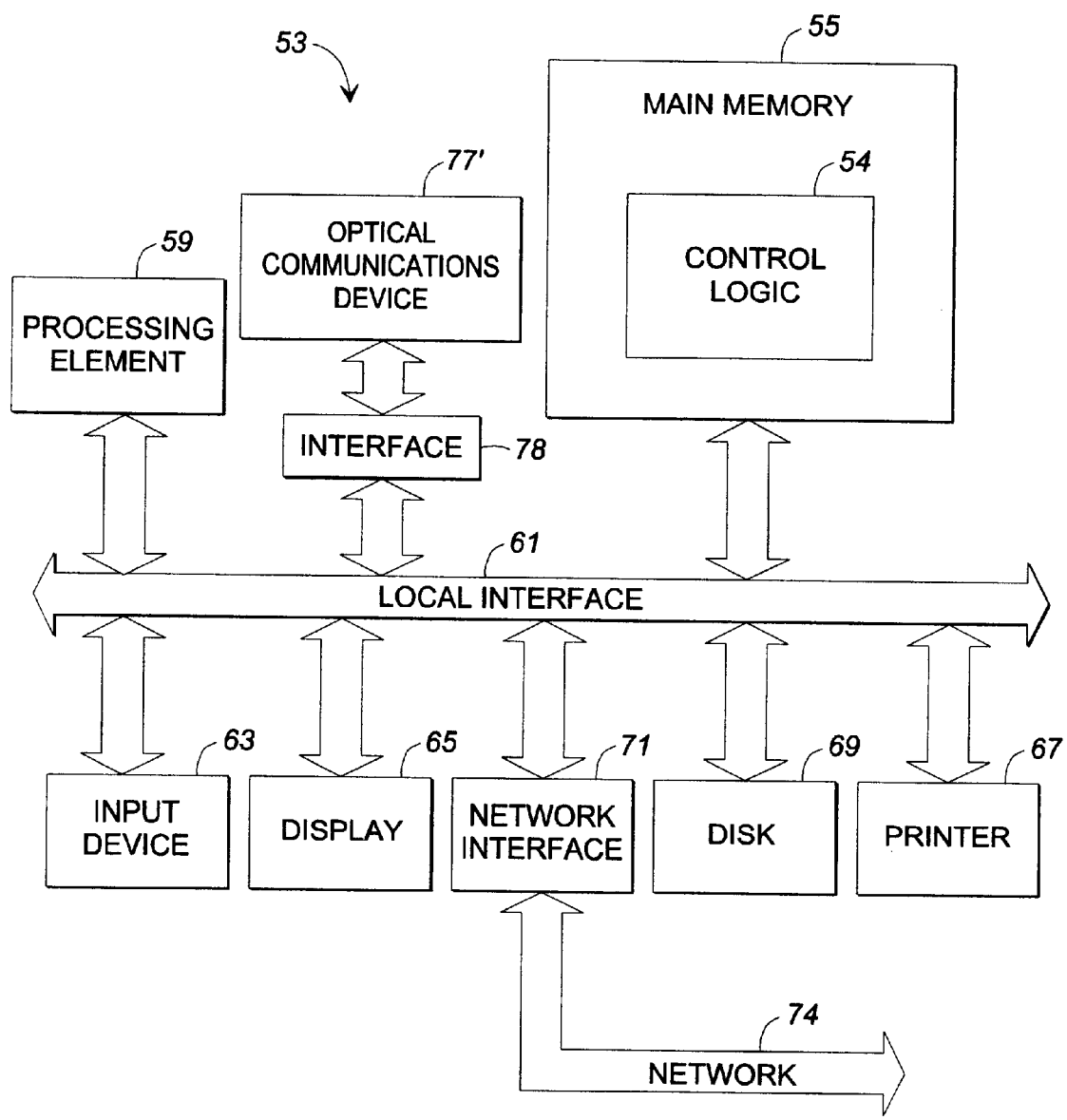
FIG. 7 is a block diagram illustrating a host computer system that may use the cartridge storage system of FIG. 1 to retrieve and store data cartridges.

The preferred embodiment of the computer system 53 of FIG. 7 comprises one or more conventional processing elements 59, such as a digital signal processor (DSP), that communicate to and drive the other elements within the system 53 via a local interface 61, which can include one or more buses. Furthermore, an input device 63, for example, a keyboard or a mouse, can be used to input data from a user of the system 53, and screen display 65 or a printer 67 can be used to output data to the user. A disk storage mechanism 69 can be connected to the local interface 61 to transfer data to and from a nonvolatile disk (e.g., magnetic, optical, etc.). The system 53 can be connected to a network interface 71 that allows the system 53 to exchange data with a network 74.

The computer system 53 also preferably includes a communications device 77' (FIGS. 1 and 7) coupled to the system 53 via any suitable interface 78. The communications device 77' communicates wireless signals with the cartridge access device 36. If the control logic 54 determines that a particular cartridge 14 should be retrieved, the control logic 54 via communications device 77' issues a request for data to the cartridge access device 36.

In the preferred embodiment the wireless signals are optical signals (e.g., infrared signals) and the communications device 77' (and optical communications device 77", as discussed later) are optical communications devices. However, other types of wireless signals can be communicated between communications devices 77' and 77", in which the communications devices 77' and 77" should be configured to be compatible with the types of signals being communicated. Since the signals are optical in the preferred embodiment, communications devices 77' and 77" will be discussed hereinafter as "optical" communications devices 77' and 77", for illustrative purposes. However, one skilled in the art should realize that communications devices 77' and 77" should be compatible with the type of wireless signals being communicated in the present invention.

A control system 81 (FIG. 8) associated with the cartridge access device 36 controls the actuator system 42 (FIGS. 5 and 6) on the cartridge access device 36 as necessary to move the cartridge access device 36 along the U-shaped path 40 until the cartridge access device 36 is located adjacent the appropriate cartridge 14. The control system 81 of the present invention can be implemented in software, hardware, or a combination thereof. In the preferred embodiment, as illustrated by way of example in FIG. 8, the control system 81 of the present invention along with its associated methodology is implemented in software and stored in computer memory 83 of a computer system 85. The computer system 85 is preferably located on the cartridge access device 36. Note that the control system 81 can be stored and transported on any computer-readable medium for use by or in connection with a computer-readable system or method.

Figure 8:
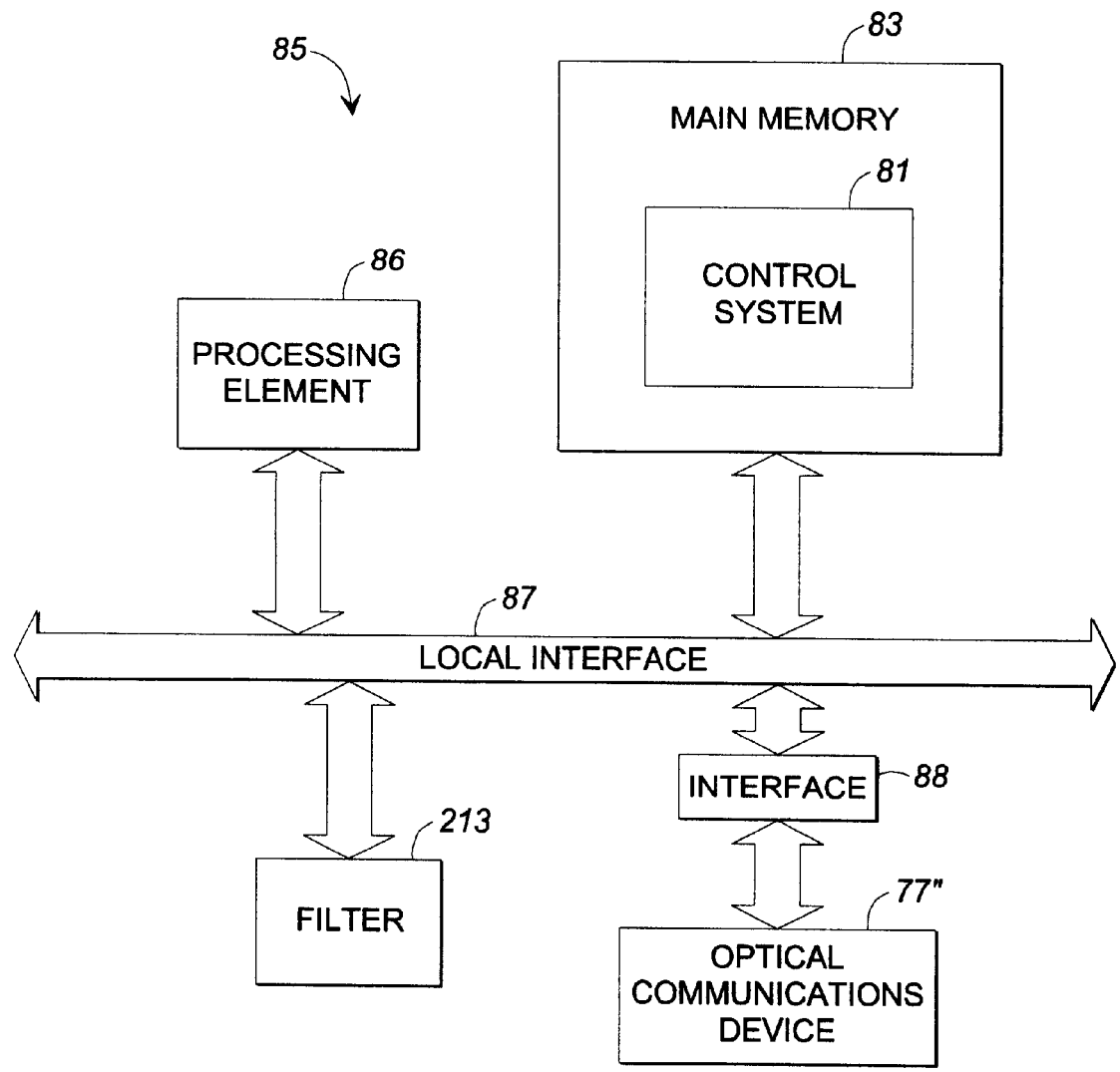
FIG. 8 is a block diagram illustrating a computer system for controlling the cartridge access device of FIG. 1.

The preferred embodiment of the computer system 85 of FIG. 8 comprises one or more conventional processing elements 86, such as a digital signal processor (DSP), that communicate to and drive the other elements within the system 85 via a local interface 87, which can include one or more buses. Furthermore, the system 85 preferably includes an optical communications device 77" for communicating optical signals with the optical communications device 77' of the computer 53. The optical communications device 77" is coupled to the system 85 via any suitable interface 88.

Consider, for example, an initial condition wherein the desired cartridge 14 is stored in one of the cartridge storage racks or magazines 16 (FIG. 1). Upon receiving a request for the cartridge 14 from the computer system 53 (FIG. 7), the control system 81 (FIG. 8) of the cartridge access device 36 (FIG. 4) operates the actuator system 42 (FIGS. 5 and 6) to move the cartridge access device 36 along the U-shaped path 40 (FIG. 1) until the cartridge access device 36 is adjacent the selected cartridge 14 in the storage rack 16. A cartridge engaging device or "picker" (not shown) associated with the cartridge access device 36 then engages the cartridge 14 and draws it into the cartridge access device 36, as depicted by FIG. 4. The actuator system 42 then actuates the pinion drive assembly 52 as necessary to move the cartridge access device 36 to a desired cartridge read/write device 18 (FIG. 1). Once properly positioned adjacent the desired cartridge read/write device 18, the cartridge engaging assembly or picker (not shown) associated with the cartridge access device 36 loads the cartridge 14 into the cartridge read/write device 18. The computer system 53 (FIG. 7) is configured to have access to the data on the cartridge 14 once the cartridge 14 is loaded into the cartridge read/write device 18.

When the cartridge 14 is no longer needed, the control system 81 (FIG. 8) may operate the actuator system 42 (FIGS. 5 and 6) to move the cartridge access device 36 (FIG. 1) along the U-shaped path 40 until the cartridge access device 36 is again located at a position adjacent the cartridge read/write device 18 (assuming the cartridge access device 36 is not already located in the appropriate position). Thereafter, the cartridge engaging assembly or picker (not shown) may retrieve the cartridge 14 from the cartridge read/write device 18. The cartridge access device 36 may then return the cartridge 14 to its appropriate location in the cartridge storage racks or magazines 16.

Having briefly described the cartridge storage system 10 according to the present invention, the various embodiments of the cartridge storage system 10 will now be described in detail. However, before proceeding with the detailed description, it should be noted that while the cartridge storage system 10 is shown and described herein as it could be used to store and retrieve magnetic cartridges 14 having a certain size and configuration (e.g., DLT or digital linear tape cartridges), it is not limited to any particular type of data cartridge. Indeed, the cartridge storage system 10 according to the present invention can be used with any type of data storage device comprising any type of data storage medium (e.g., magnetic disk or tape, optical disk, etc.). Consequently, the present invention should not be regarded as limited to use with the particular type and style of cartridge 14 shown and described herein.

Referring back to FIG. 1, one embodiment of the cartridge storage system 10 according to the present invention may comprise a main housing or chassis 154 configured to hold the various components of the cartridge storage system 10. For example, in one preferred embodiment, the main housing or chassis 154 may comprise a generally rectangularly shaped structure adapted to receive the cartridge handling system 12, one or more cartridge-receiving devices, such as one or more cartridge storage racks or magazines 16 and one or more cartridge read/write devices 18. The housing or chassis 154 may also be adapted to receive any of a wide range of other components or devices (e.g., control systems, power supplies, etc.) well-known in the art and that may be required or desired for the operation of the cartridge storage system 10. The housing or chassis 154 may also be provided a cartridge magazine access end 156 to allow a user to access the cartridge storage racks or magazines 16. An access door (not shown) may be provided on the access end 156 to provide access to the cartridge magazines 16. Although not required, the housing or chassis 154 is preferably sized to be received by a standard storage rack system (not shown), such as an EIA rack assembly available from Crenlo Corp. of Minnesota (USA).

In one preferred embodiment, the cartridge handling system 12 may comprise a generally rectangularly shaped structure having a first cartridge access side 20, a second cartridge access side 22, and a third cartridge access side 24. As used herein, the term "cartridge access side" refers to any side of the cartridge handling system 12 from which cartridges 14 may be accessed, either from a cartridge storage rack or magazine 16 or a cartridge read/write device 18.

The cartridge handling system 12 defines the general arrangement of the cartridge access planes associated with the cartridge-receiving devices (e.g., the cartridge storage racks or magazines 16 and the cartridge read/write devices 18). That is, the cartridge-receiving devices should be arranged around the cartridge handling system 12 so that the cartridge access planes defined by the cartridge-receiving devices are located at positions adjacent the cartridge access sides of the cartridge handling system 12. For example, in one preferred embodiment, the various cartridge-receiving devices (e.g., the cartridge storage racks or magazines 16 and cartridge read/write devices 18) are arranged around the cartridge handling system 12 so that first cartridge access plane 41 is positioned adjacent the first cartridge access side 20, the second cartridge access plane 43 is positioned adjacent the second cartridge access side 22, and the third cartridge access plane 45 is positioned adjacent the third cartridge access side 24.

In accordance with the forgoing considerations, the various cartridge-receiving devices (e.g., the cartridge storage racks or magazines 16 and the cartridge read/write devices 18) may be located adjacent any cartridge access side (e.g., 20, 22, and 24) of the cartridge handling system 12 in any of a variety of arrangements. For example, in one preferred embodiment, two cartridge storage racks or magazines 16 are located adjacent the first cartridge access side 20 of the cartridge handling system 12, whereas another pair of magazines 16 are located adjacent the third cartridge access side 24. A pair of cartridge read/write devices or "drives" 18 are located adjacent the second cartridge access side 22 of the cartridge handling system 12. Alternatively, a different number of cartridge storage racks 16 could be provided, or the cartridge read/write devices 18 could be located adjacent either or both of the first or third cartridge access sides 20 and 24.

The U-shaped arrangement of the cartridge storage magazines 16 and cartridge read/write devices 18 just described and shown in FIG. 1 for the preferred embodiment allows the various cartridge storage racks or magazines 16 to be easily accessed by a user from the cartridge access end 156 of the chassis or housing assembly 154. That is, the user may replace the various magazines 16 from time to time to provide different cartridges 14 to the cartridge storage system 10. Alternatively, the various cartridge storage racks or magazines 16 and cartridge read/write devices 18 could be configured around the cartridge handling system 12 in any other convenient arrangement depending on the requirements of the particular application.

Referring to FIG. 2, the cartridge handling system 12 preferably comprises a generally rectangular structure or frame assembly 26 that includes a lower or base plate 28, an upper or top plate 30, and a support structure 47. The support structure 47 holds or positions the lower plate 28 and upper plate 30 in generally parallel, spaced-apart relation. The frame assembly 26 defines a first cartridge access side 20, a second cartridge access side 22, and a third cartridge access side 24. The first and third cartridge access sides 20 and 24 are positioned in spaced-apart relation, whereas the second cartridge access side 22 is positioned generally transverse to the first and third cartridge access sides 20 and 24. Accordingly, the three cartridge access sides 20, 22, and 24 define a generally U-shaped configuration about which the various cartridge magazines 16 and read/write devices 18 may be arranged. See FIG. 1. Alternatively, however, the various cartridge access sides 20, 22, and 24 can be arranged in other configurations.

For example, instead of being positioned at substantially right angles to one another, the various cartridge access sides 20, 22, and 24 could be positioned so that they form oblique (i.e., non-perpendicular) angles with respect to one another, such as would be the case if the frame assembly 26 comprised a pentagonal (5-sided) or hexagonal (6-sided) configuration. In still another alternative, the cartridge access sides 20, 22, and 24 need not comprise straight segments, but could instead comprise curvilinear segments or portions, such as may be the case if the frame assembly 26 were provided with a circular or semi-circular cross-section. Consequently, the present invention should not be regarded as limited to a frame assembly 26 having cartridge access sides 20, 22, and 24 arranged according to the geometrical configurations shown and described herein.

Figure 9:
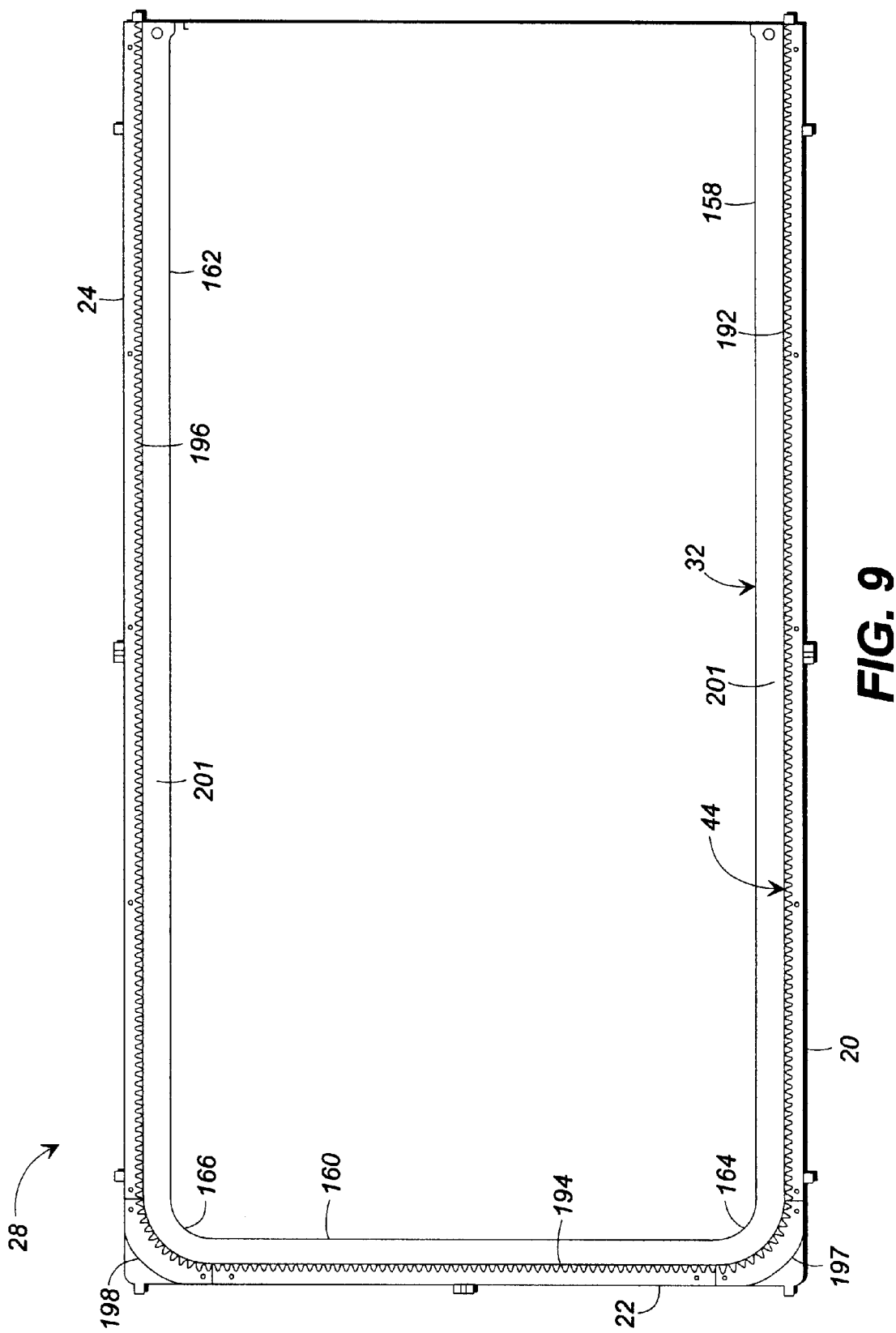
FIG. 9 is a top view of a lower plate of the frame assembly of FIG. 2.

Referring to FIGS. 3 and 9, the lower plate 28 may comprise a plate-like, generally rectangular member that includes a lower guide member or channel 32 therein. The lower guide member or channel 32 may comprise a first elongate section 158 located adjacent the first cartridge access side 20 and a second elongate section 160 located adjacent the second cartridge access side 22. The lower guide member or channel 32 may also include a third elongate section 162 that is located adjacent the third cartridge access side 24. The second elongate section 160 is joined to the first and third elongate sections 158 and 162 by respective rounded corner sections 164 and 166. Accordingly, the first, second, and third elongate sections 158, 160, and 162 define a substantially continuous guide member 32 that extends along the three cartridge access sides 20, 22, and 24 of the cartridge handling system 12.

The upper plate 30 is essentially identical to the lower plate 28 just described and may comprise a plate-like, generally rectangular member having an upper U-shaped guide member or channel 34 therein. The upper U-shaped guide member 34 may include first and third elongate sections 168 and 170 that are located adjacent the respective first and third cartridge access ends 20 and 24. See FIG. 3. The upper guide member or channel 34 may also include a second elongate section (not shown) located adjacent the second cartridge access side 22. The second elongate section (not shown) of the upper guide member or channel 34 is connected to the first and third elongate sections 168 and 170 by respective rounded corner sections (not shown) in a manner essentially identical to those of the lower guide member 32 in the lower plate 28.

The lower and upper plates 28 and 30 may be made from any of a wide range of materials, such as metals or plastics, suitable for the intended application. By way of example, in the preferred embodiment, the lower and upper plates 28 and 30 are molded as single pieces from a polycarbonate plastic material, although other materials could also be used. The lower and upper guide members or channels 32 and 34 formed within the lower and upper plates 28 and 30 may have any of a wide range of widths and depths suitable for the intended application. In the preferred embodiment, both lower and upper guide channels 32 and 34 have widths of about 7.16 mm and depths of about 6.0 mm.

The support structure 47 for holding the lower and upper plates 28 and 30 in essentially parallel, spaced-apart relation may be made from any of a wide range of materials, such as metals or plastics, suitable for the intended application. In the preferred embodiment, the support structure 47 is fabricated from sheet metal and is secured to the lower and upper plates 28 and 30 by any convenient fastener system or device (e.g., screws).

Referring to FIG. 4, the cartridge access device 36 may comprise a structure sized to receive the cartridges 14 (FIG. 1) used in the cartridge storage system 10. The cartridge access device 36 may also be provided with a cartridge engaging assembly or "picker" (not shown) suitable for loading and retrieving the cartridges 14 to and from the particular cartridge-receiving device (e.g., cartridge storage rack 16 or cartridge read/write device 18) in which the cartridge 14 is held. Examples of cartridge engaging assemblies or "pickers" suitable for use in the present invention are disclosed in the following U.S. patents which are specifically incorporated herein by reference: U.S. Pat. No. 4,998,232 entitled "Optical Disk Handling Apparatus with Flip Latch;" U.S. Pat. No. 5,010,536 entitled "Cartridge Handling System;" U.S. Pat. No. 5,014,255 entitled "Optical Disk Cartridge Handling Apparatus with Passive Cartridge Engagement Assembly;" and U.S. Pat. No. 5,043,962 entitled "Cartridge Handling System." Alternatively, any of a wide range of other types of cartridge engaging assemblies or pickers that are well-known in the art also may be used in the present invention. In any event, since such cartridge engaging assemblies or "pickers" are well-known in the art and are not necessary in understanding the present invention, the particular cartridge engaging assembly utilized will not be described in further detail.

Regardless of the particular type of style of cartridge engaging assembly or "picker" that is utilized in the cartridge access device 36, the cartridge access device 36 may be mounted to the lower and upper U-shaped guide members 32 and 34 so that the cartridge access device 36 may be moved along the first, second and third cartridge access sides 20, 22, and 24 generally following the U-shaped path 40. See FIG. 1. More specifically, the cartridge access device 36 may be retained in the lower U-shaped guide member or channel 32 by a pair of lower engaging members 174 and 176 that extend from the bottom of the cartridge access device 36. In one preferred embodiment, the lower engaging member 174 may be attached to a shaft 182 that may be mounted to the cartridge access device 36. Alternatively, other mounting arrangements could be used to attach the lower engaging member 174 to the cartridge access device 36, as would be obvious to persons having ordinary skill in the art. The lower engaging member 176 may be attached to the end of the lower pinion 48, in the manner depicted by FIG. 4, or may even comprise an integral portion of the lower pinion 48.

The top of the cartridge access device 36 may be provided with a pair of upper engaging members 186 and 188 that are sized to be slidably received in the upper U-shaped guide member or channel 34. The upper engaging member 186 may be mounted to the top of the cartridge access device 36. The upper engaging member 188 may be mounted to the end of the upper pinion 50, or may even comprise an integral portion of the upper pinion 50. The lower and upper engaging members 174, 176, 186, and 188 guide the cartridge access device 36 along the lower and upper guide members 32 and 34 associated with the lower and upper plates 28 and 30. Finally, the bottom of the cartridge access device 36 may be provided with a guide wheel 190 (FIGS. 5 and 6) which contacts the lower plate 28 and supports the weight of the cartridge access device 36. Optionally, the distal end 192 of the cartridge access device 36 also may be provided with a similar wheel arrangement (not shown) to support the distal end 192 of the cartridge access device 36.

Except as described hereinafter, the lower and upper engaging members 174, 176, 186, and 188 may be made from any of a wide range of materials, such as metals or plastics (e.g., copper, brass or nylon), suitable for providing a low friction engagement with the respective lower and upper guide members or channels 32 and 34 in the respective lower and upper plates 28 and 30. In the preferred embodiment, the lower and upper engaging members 174, 176, 186, and 188 have diameters of about 7.01 mm which provides 0.15 mm of clearance between the engaging members and the guide channels, which, as mentioned above, have widths of about 7.16 mm.

Figure 10:
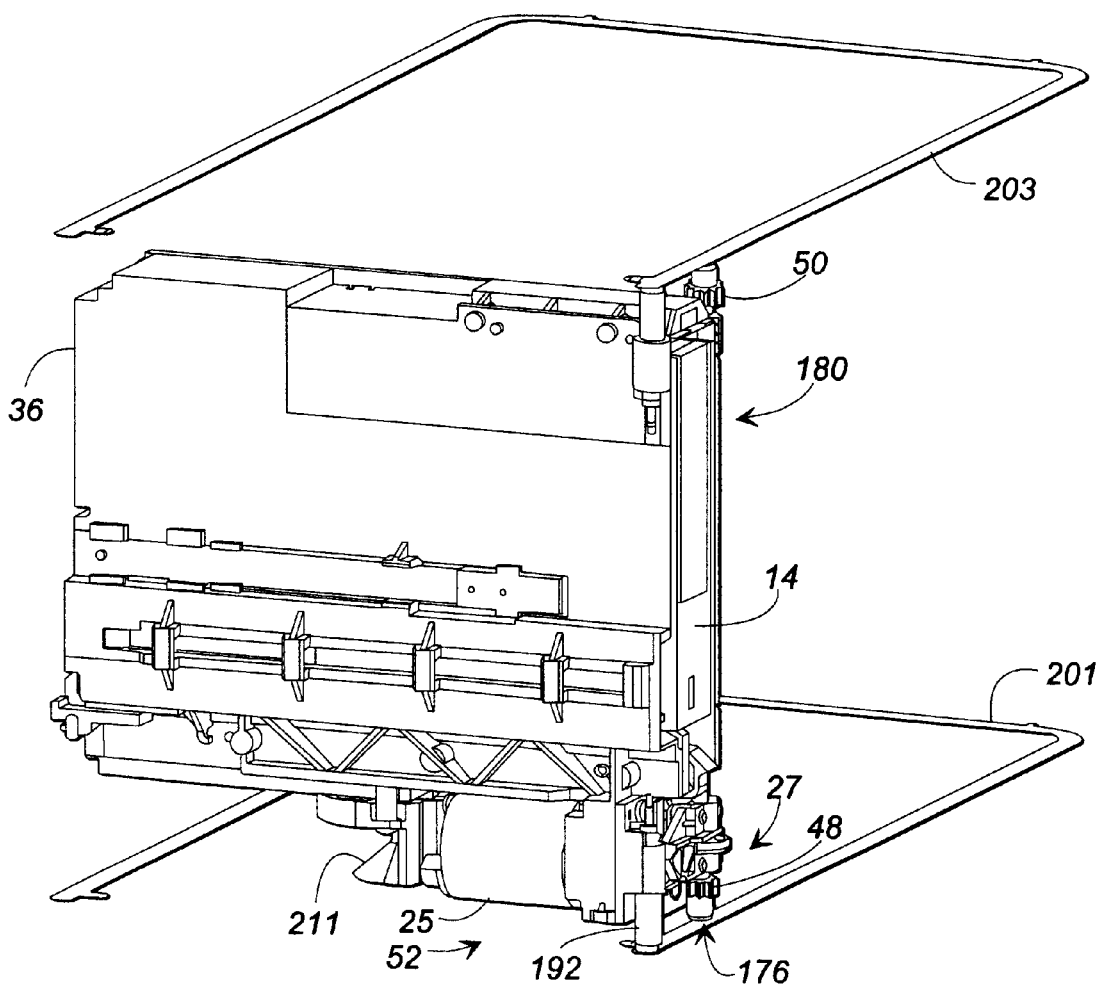
FIG. 10 is a three-dimensional side view of the cartridge access device of FIG. 4 coupled to power tracks that supply electrical power and control signals to the cartridge access device.

In order to eliminate the need to attach a power cable to the cartridge access device 36, at least one of the lower engaging members 174 and 176 and at least one of the upper engaging members 186 and 188 form a brush capable of providing electrical power to the cartridge access device 36. In this regard, the lower engaging members 174 and 176 and the upper engaging members 186 and 188 are preferably engaged with power tracks 201 and 203, respectively, as depicted by FIG. 10. The power tracks 201 and 203 are preferably attached to the lower and upper plates 28 and 30 in channels 32 and 30, respectively, as depicted by FIGS. 3, 9, and 10. The power tracks 201 and 203 are preferably comprised of a conductive material, such as copper for example. Each power track 201 and 203 is preferably a continuous member attached to and extending along a surface of the lower and upper plates 28 and 30 within the channel 32 and 34, respectively. However, it is possible that the power tracks 201 and 203 may be located side of the channels if desired. The power tracks 201 and 203 are located within the channels 32 and 34 in the preferred embodiment in order for the engaging members 174 and 186 (which are coupled to the power tracks 201 and 203, respectively) to help guide the cartridge access device 36 around the U-shaped path 40.

Figure 11A:
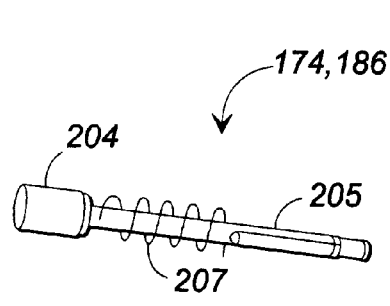
FIG. 11A is a three-dimensional side view of an engaging member that is coupled to the cartridge access device and engages the power tracks of FIG. 10.

For illustrative purposes, assume that engaging members 174 and 186 are configured to provide power to the cartridge access device 36. Referring to FIG. 11A, each engaging member 174 and 186 includes a brush 204 coupled to a rod 205. The brush 204 is preferably cylindrical in order to facilitate movement of the brush 204 through the channel 32 or 34, especially at the corners of the channels 32 or 34. The brush 204 is preferably comprised of a conductive material in order for the engaging member 174 or 186 to pass electrical power received from the power track 201 or 203, respectively, to other components in the access cartridge device 36. Furthermore, since the brush 204 engages the power track 201 or 203 as the cartridge access device 36 moves around the U-shaped path 40, the brush 204 is preferably comprised of a durable material having a low coefficient of friction on the surface.

Figure 11B:
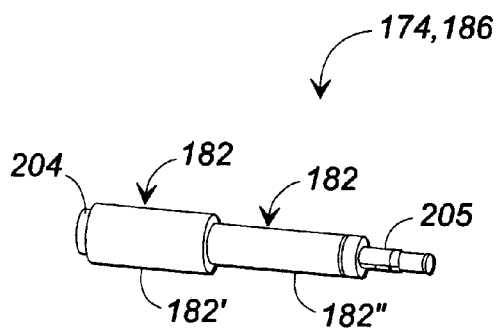
FIG. 11B is a three-dimensional side view of the engaging member of FIG. 11A once the engaging member is inserted into a shaft.

The rod 205 is preferably coupled to a spring 207. The engaging member 174 or 186 is then inserted into shaft 182, as depicted by FIG. 11B. Preferably, the shaft includes two sections, a larger portion 182' and a smaller portion 182", each portion 182' and 182" having a hole or other type of hollow region. The hole of the larger portion 182' preferably has a diameter or width larger than the diameter or width of the spring 207, and the hole of the smaller portion 182" preferably has a diameter or width smaller than the diameter or width of the spring 207. Furthermore, the engaging member 174 or 186 is preferably inserted into the larger portion 182' of the shaft before being inserted into the smaller portion 182" (i.e., the rod 205 is inserted into the larger portion 182' first), and the rod 205 is preferably inserted into the shaft 182 first (i.e., the rod 205 is inserted into the shaft 182 before the brush 204).

Therefore, when the engaging member 174 or 186 is inserted into the shaft 182, the spring 207 engages the smaller portion 182" of the shaft 182 and is compressed as the engaging member 174 or 186 is inserted further into the shaft 182. Consequently, the spring 207 generates a force on the brush 204 and rod 205 that tends to push the brush 204 away from the shaft 182. As a result, when the engaging members 174 and 186 are engaged with the power tracks 201 and 103, respectively, as depicted by FIG. 10, the force generated by the spring 207 tends to push the brush 204 against the power track 201 or 203. Moreover, as the cartridge access device 36 moves around the U-shaped path 40, the force generated by the spring 207 ensures that the brush 204 is engaged with the power track 201 or 203.

The rod 205 is preferably comprised of a conductive material in order to allow electrical current to flow through the rod 205. Although other materials are possible, the rod 205 is preferably comprised of brass, since brass is conductive and resistant to fatigue that may be caused by the forces generated on the rod 205 as the cartridge access device 36 moves along the U-shaped path 40.

Preferably, a voltage potential exists between the power tracks 201 and 203. For example, the power track 201 can be configured to maintain a ground voltage, while the power track 203 can be configured to maintain a power voltage (i.e., a voltage different than the ground voltage) or vice versa. Therefore, in the example where the power track 201 maintains the ground voltage, the brush 204 and rod 205 of the upper engaging member 186 supplies the power voltage to the cartridge access device 36, and the brush 204 and rod 205 of the lower engaging member 174 supplies the ground voltage to the cartridge access device 36. In this regard, power wires can be connected to the rods 205 of the upper and lower engaging members 174 and 186, which carry the power to other components in the cartridge access device 36 through techniques known in the art. Since the upper and lower engaging members 174 and 186 provide the electrical power to the cartridge access device 36, a power cable does not need to be attached to the cartridge access device 36 in order to provide power to the components of the cartridge access device 36. Instead, a connection or terminal having one voltage should be connected to power track 201, and another connection or terminal having another voltage should be connected to power track 203.

As described above, the cartridge access device 36 is moved along the lower and upper guide members 32 and 34 by an actuator system 42 (FIGS. 5 and 6). In the preferred embodiment, the actuator system 42 may comprise a rack and pinion drive system having a substantially continuous lower gear rack 44 provided on the lower plate 28 at a position adjacent the lower U-shaped guide member or channel 32. Similarly, a substantially continuous upper gear rack 46 (FIG. 3) may be provided on the upper plate 30 at a position adjacent the upper U-shaped guide member or channel 34. Lower and upper drive pinions 48 and 50 (FIGS. 4–6) mounted to the cartridge access device 36 engage the respective lower and upper gear racks 44 and 46. The pinion drive assembly 52 mounted to the cartridge access device 36 rotates the lower and upper pinion gears 48 and 50 to move the cartridge access device 36 back and fourth along the U-shaped path 40 (FIG. 1).

Referring now specifically to FIGS. 3 and 9, the lower gear rack 44 may comprise first and second elongate sections 192 and 194 that are provided on the lower plate 28 adjacent the first and second elongate sections 158 and 160 of the lower guide member or channel 32. A third elongate section 196 may be provided on the lower plate 28 at a position adjacent the third elongate section 162 of lower guide member 32. The second elongate section 194 of lower gear rack 44 may be joined to the first and third elongate sections 192 and 196 of lower gear rack 44 by respective rounded corner sections 197 and 198. The lower gear rack 44 may therefore comprise a substantially continuous, U-shaped member that extends along substantially the entirety of the lower U-shaped guide member or channel 32.

The upper gear rack 46 is essentially identical to the lower gear rack 44 just described and may include first and third elongate sections 191 and 195 that are provided on the upper plate 30 at positions adjacent the respective first and third elongate sections 168 and 170 of the upper guide member or channel 34. A second elongate section 93 may be provided on the upper plate 30 at a position adjacent the second elongate section (not shown) of upper guide member 34. The second elongate section 93 of upper gear rack 46 may be connected to the first and third elongate sections 191 and 195 of upper gear rack 46 by respective rounded corner sections 189 and 199. The upper gear rack 46 may therefore comprise a substantially continuous, U-shaped member that extends along substantially the entirety of the upper U-shaped guide member or channel 34.

The lower and upper gear racks 44 and 46 may be made from any of a wide variety of materials, such as metals or plastics, suitable for the intended application. By way of example, in one preferred embodiment wherein the lower and upper plates 28 and 30 are molded from a polycarbonate plastic material, the lower and upper gear racks 44 and 46 are provided as integrally molded portions of the lower and upper plates 28 and 30 (i.e., the lower and upper gear racks 44 and 46 comprise the polycarbonate plastic material). Alternatively, the lower and upper gear racks 44 and 46 may comprise separate components that are then fixedly attached to the lower and upper plates 28 and 30 by any of a wide range of fastening systems or devices (e.g., adhesives, screws, rivets, etc.).

The lower and upper gear racks 44 and 46 may be provided with any convenient tooth pitch suitable for the intended application. In one preferred embodiment, the lower and upper gear racks 44 and 46 may have a tooth pitch of about 32, although other tooth pitches may also be used.

Referring now to FIGS. 3–6, the cartridge access device 36 may be provided with lower and upper pinion gears 48 and 50 which engage the lower and upper gear racks 44 and 46, respectively. The lower and upper pinion gears 48 and 50 may be mounted to a drive shaft 15 which may be journalled for rotation in the cartridge access device 36. Therefore, as the drive shaft 15 is rotated by the pinion drive assembly 52, the lower and upper pinion gears 48 and 50 are rotated, thereby moving the cartridge access device 36.

The pinion drive assembly 52 may comprise a motor 25 and a reduction gear assembly 27 mounted within gearbox housing 23. The reduction gear assembly 27 may comprise one or more spur gears for reducing the speed of the motor 25. The drive shaft 15 may be operatively connected to the output pinion 29 of reduction gear assembly by a face gear 31. Alternatively, other types of gear arrangements may be used.

In the preferred embodiment, the reduction gear assembly 27 may be provided with an encoder system (not shown) to monitor the angular position of a selected gear in the reduction gear assembly 27. The angular position of the selected gear provided by the encoder system (not shown) may be used by the control system 81 (FIG. 8) to derive information about the position, velocity, and acceleration of the cartridge access device 36. However, since such encoder systems are well-known in the art and could be easily provided by persons having ordinary skill in the art after having become familiar with the teachings of the present invention, the particular encoder system utilized in the preferred embodiment of the present invention will not be described in further detail.

The reduction gear assembly 27 may comprise any of a wide variety of gear reduction systems, such as spur gear reduction systems, well-known in the art. Alternatively, a worm gear reduction system (not shown) could also be used. The motor 25 may comprise a permanent magnet d.c. motor, such as type RS-385PH, available from Mabuchi Motor Corp. of China. Alternatively, other types of motors may be provided. The characteristics of the particular type of motor that is selected will determine the reduction ratio that is provided by the reduction gear assembly 27. As an example, the reduction gear assembly 27 provides a reduction ratio of about 12:1 in the preferred embodiment, although other reduction ratios may be used.

In an alternative embodiment, other types of actuator systems 42 may be used to move the cartridge access device 36 along the lower and upper guide members or channels 32 and 34. For example, a chain or belt drive arrangement could be used to connect the motor 25 and the cartridge access device 36 to move the cartridge access device 36 along the lower and upper guide members or channels 32 and 34. In yet another arrangement, a wire rope or "cable" and pulley arrangement may be used to connect the cartridge access device 36 to the motor 25.

As mentioned above, the cartridge storage system 10 may be provided with a control system 81 (FIG. 8) suitable for controlling, among other things, the actuator system 42 associated with the cartridge handling system 12. For example, such a control system 81 can operate the actuator system 42 to move the cartridge access device 36 along the U-shaped path 40 (FIG. 1) so that the cartridge access device 36 may access the desired cartridge 14 from either the cartridge storage rack or magazine 16 or the cartridge read/write device 18, as the case may be.

For example, referring to FIGS. 1, 7 and 8, the computer system 53 may determine that a particular cartridge 14 is needed for processing (i.e., for writing data to or reading data from the particular cartridge 14). The computer system 53 transmits a request for retrieval of the particular cartridge 14 to the control system 81 within the cartridge access device 36. In this regard, the computer system 53 preferably includes an optical communications device 77' which is designed to communicate with the optical communications device 77" of the computer system 85 on the cartridge access device 36. The optical communications devices 77' and 77" preferably include any suitable optical transmitter and receiver designed to communicate optical signals. Although other types of optical signals are possible, the preferred embodiment of the present invention utilizes infrared signals to communicate between optical communications device 77' and optical communications device 77". In this regard, there are many commercially available infrared communications devices 77' and 77" that are suitable for communicating infrared signals according to the principles of the present invention.

In order for the optical communications devices 77' and 77" to be capable of communication independent of the cartridge access device's location along the U-shaped path 40, the cartridge access device 36 preferably includes a conical device 211, as depicted by FIGS. 2, 4, 10, and 12. The conical device 211 is preferably comprised of a material that reflects optical light. Furthermore, the conical device 211 is preferably positioned so that the conical device 211 remains within view of the optical device 77' as the cartridge access device 36 moves around the U-shaped path 40. Therefore, in the preferred embodiment, the conical device 211 is positioned on a lower surface of the cartridge access device 36, as depicted by FIG. 4. However, the conical device 211 may be located in other positions relative to the cartridge access device 36 without departing from the principles of the present invention. Since the conical device 211 is comprised of a reflective material and since the conical device 211 is in view of the optical communications device 77' regardless of the cartridge access device's position along the U-shaped path 40, the conical device 211 is designed to reflect each optical signal transmitted from the optical communications device 77'.

Figure 12:
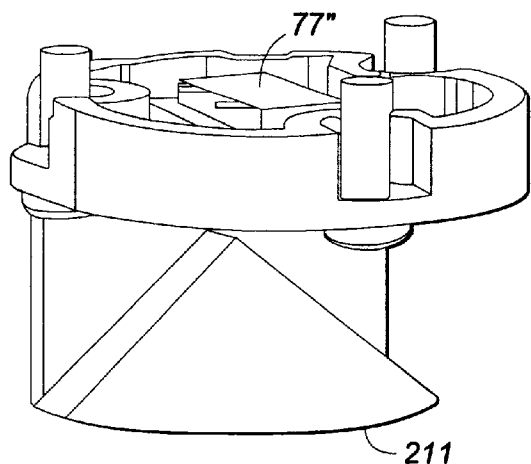
FIG. 12 is a three dimensional side view of a conical device and an optical communications device used by the cartridge access device of FIG. 4 to communicate with the computer system of FIG. 7.
Figure 13:
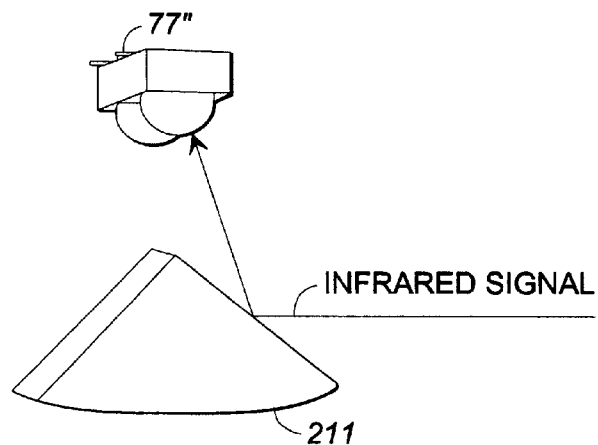
FIG. 13 is a three-dimensional side view of the optical communications device and conical device of FIG. 12 illustrating optical light being reflected into the optical communications device.

In addition, the optical communications device 77" is preferably positioned adjacent to (i.e., directly above) the tip of the conical device 211, as depicted by FIG. 12. The slope of the sides of the conical device 211 directly facing the optical communications device 77' are configured to reflect the light transmitted from the optical communications device 77' into the receiver portion of optical communications device 77", as depicted by FIG. 13. As the cartridge access device 36 moves around the U-shaped path 40, different sides of the conical device 211a directly face the optical communications device 77' and reflect light into the receiver portion of the optical communications device 77". Therefore, as the cartridge access device 36 moves around the U-shaped path 40, each optical signal transmitted from the optical communications device 77' is reflected into the receiver portion of the optical communications device 77", regardless of the cartridge access device's location on the U-shaped path 40.

Figure 14A:
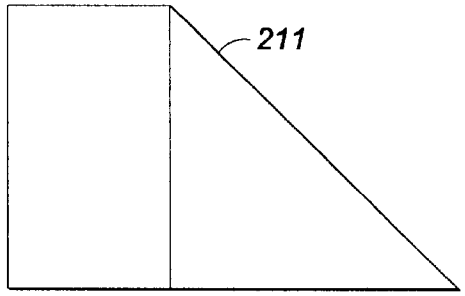
FIG. 14A is a side view of the conical device of FIG. 13.
Figure 14B:
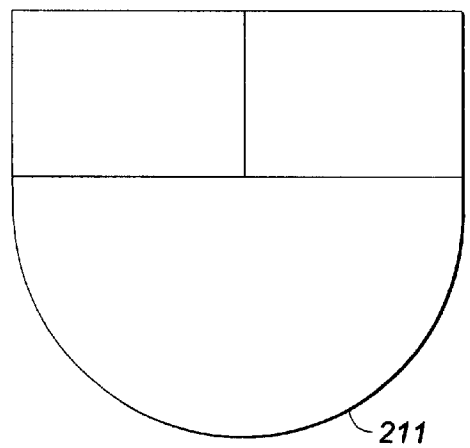
FIG. 14B is a top view of the conical device of FIG. 14A.

It should be noted that in the preferred embodiment the side of the conical device 211 that faces the pinion drive assembly 52 does not directly face the optical communications device 77' at any of the locations along the U-shaped path 40. Therefore, the side of the conical device 211 that does not directly face the optical communications device 77' at any of the locations along the U-shaped path 40 (i.e., the side that faces the pinion device assembly 52 in the preferred embodiment) does not have to be conical, as depicted by FIGS. 12, 14A and 14B.

Furthermore, by being located adjacent to the tip of the conical device 211, each optical signal transmitted by the optical communications device 77" is reflected by at least each conical side of the conical device 211 that directly faces the optical communications device 77' at some point as the cartridge access device 36 moves around the U-shaped path 40. Therefore, the optical communications device 77'receives light from each signal transmitted by optical communications device 77" regardless of the cartridge access device's position on the U-shaped path 40, since at least one side of the conical device 211 is directly facing the optical communications device 77' at each position of the cartridge access device 36 along the U-shaped path 40. As a result, communication between the optical communication devices 77' and 77" is maintained as the cartridge access device 36 moves around the U-shaped path 40.

When the control system 81 receives the request from the computer system 53 to retrieve a cartridge 14, the control system 81 translates the request through conventional processing techniques to determine which cartridge 14 should be retrieved. The control system 81 then transmits control signals to actuator system 42. In response to the control signals, the actuator system 42 moves the cartridge access device 36 along the U-shaped path 40 until the cartridge access end 180 of the cartridge access device 36 is located adjacent the appropriate cartridge 14.

For example, if the desired cartridge 14 is stored in one of the cartridge storage racks or magazines 16, then the actuator system 42 in response to the control signals transmitted from the control system 81 moves the cartridge access device 36 until the cartridge access device 36 is directly opposite the selected cartridge 14. The cartridge engaging device or "picker" (not shown) associated with the cartridge access device 36 then engages the cartridge 14 and draws it into the cartridge access device 36. Once the cartridge 14 has been completely drawn into the cartridge access device 36, the actuator system 42 in response to control signals from the control system 81 actuates the pinion drive assembly 52 as necessary to move the cartridge access device 36 to the desired cartridge read/write device 18. Once properly positioned adjacent the desired cartridge read/write device 18, the cartridge picker (not shown) loads the cartridge 14 into the cartridge read/write device 18. The computer system 53 can be configured to detect the loading of the desired cartridge in the appropriate cartridge read/write device 18, and via optical communications devices 77' and 77", the control system 81 can be configured to transmit a signal indicating that the cartridge 14 has been loaded in the read/write device 18. After determining that the appropriate cartridge 14 has been loaded, the computer system 53 may then read from or write to the cartridge 14 through conventional techniques.

When the cartridge 14 is no longer needed, the computer system 53 via communications devices 77' and 77" preferably notifies the control system 81 that the cartridge 14 should be removed from the cartridge read/write device 18. In response, the control system 81 transmits control signals to the actuator system 42 that causes the cartridge access device 36 to move along the U-shaped path 40 to position the cartridge access device 36 opposite the cartridge read/write device 18 (assuming that the cartridge access device 36 is not already located in the appropriate position). Thereafter, the cartridge picker (not shown) retrieves the cartridge 14 from the cartridge read/write device 18. The cartridge access device 36 then moves along the U-shaped path 40 until the cartridge access device 36 is opposite of the appropriate cartridge storage rack or magazine 16. The picker (not shown) then returns the cartridge 14 to its appropriate location in the cartridge storage racks or magazines 16.

Although, the present invention has been described hereinabove as utilizing optical signals to communicate between the computer system 53 and the control system 81, other communication techniques may be utilized without departing from the principles of the present invention. For example, similar to the juke boxes of the prior art, a cable may be attached from the computer system 53 to the computer system 85 located on the cartridge access device 36 in order to communicate signals between the two system 53 and 85. However, it is preferable to utilize optical communications devices 77' and 77" instead of a cable, because optical communication is less likely to interfere with the motion of the cartridge access device 36.

Another type of communication that may be used without interfering with the motion of the cartridge are high frequency control signals communicated through the engaging members 174 and/or 186 mentioned hereinbefore. In this regard, control signals transmitted from the computer system 53 are preferably combined with the power signal supplied by the power track 201 or 203 through techniques known in the art. Therefore, the control signals are preferably superimposed on the power signal. Power signals are typically low frequency signals (e.g., below approximately 100 Hertz). Consequently, the power signal can be passed through a high-pass filter 213 (FIG. 8) designed to filter out the power signal in order to recover the control signals. The control system 81 then can use the control signals to appropriately control the movement of the cartridge access device 36, as described hereinbefore. Since the control signal communicated between computer systems 53 and 85 can be communicated between the power track 201 or 203 and the engaging member 174 or 186, it is not necessary to attach a control cable to the cartridge access device 36.

It should be noted that the control signals transmitted to the power track 201 or 203 should have a high enough frequency for the high-pass filter 213 to filter out the power signal without significantly attenuating the control signals. Furthermore, it may be possible to provide the power tracks 201 and 203 with a power signal of a high enough frequency so that the frequency of the control signal can be lower than the frequency of the power signal without affecting the ability to filter the power signal from the combined signal. In this regard, the filter 213 should define a low-pass filter.

By providing the cartridge access device 36 with power via the upper and lower engaging members 174 and 186 and by communicating control signals between the computer system 53 and the control system 81 via optical signals or via the power signal, the need for coupling a cable (i.e., a power cable or a control cable) to the cartridge access device 36 is eliminated. Therefore, the cartridge access device 36 can move along the U-shaped path 40 (or any other desirable path) more freely and without interference from a power cable or a control cable.

It should be noted that although the present invention has been described hereinabove as communicating control signals for operation of the cartridge access device 36 between the optical communications devices 77' and 77", other types of signals communicated between devices 77' and 77" are possible. For example, status signals indicating the status of the cartridge access device 36 or other types of data signals may be communicated between the optical communications devices 77' and 77" without departing from the principles of the present invention.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims.

Now, therefore, the following is claimed:

1. A system for transferring cartridges, comprising:
   a frame assembly having a first surface and a second surface, said first surface having a first channel and said second surface having a second channel;
   a first conductive track member extending through said first channel;
   a second conductive track member extending through said second channel; and
   a cartridge access device for holding a cartridge and for transferring said cartridge to another location, said cartridge access device having a first conductive engaging member engaged with said first conductive track member and having a second conductive engaging member engaged with said second conductive track member, said first conductive track member having a voltage different than a voltage of said second conductive track member, wherein said first engaging member comprises a spring for pressing said first engaging member against said first conductive track member.

2. The system of claim 1, further comprising an actuator coupled to said cartridge access device, said actuator configured to move said cartridge access device, wherein said first engaging member slides along a surface of said first conductive track member when said cartridge access device moves and said second engaging member slides along a surface of said second conductive track member when said cartridge access device moves.

3. The system of claim 1, wherein said system is a data storage system.

4. The system of claim 1, wherein said first engaging member further comprises a brush engaged with said first conductive track member.

5. A system for transferring cartridges, comprising:
   a frame assembly having a first surface and a second surface, said first surface having a first channel and second surface having a second channel,
   a first conductive track member extending through said first channel;
   a second conductive track member extending through said second channel; and
   a cartridge access device for holding a cartridge and for transferring said cartridge to another location, said cartridge access device having a first conductive engaging member engaged with said first conductive track member and having a second conductive engaging member engaged with said second conductive track member, said first conductive track member having a voltage different than a voltage of said second conductive track members,
   wherein said first engaging member further comprises:
   a shaft having a hole;
   a brush engaged with said first conductive track member;
   a rod coupled to said brush and inserted into said hole; and a spring coupled to said rod and engaged with said shaft.

6. The system of claim 5, wherein said spring is compressed and generates a force that pushes said brush toward said first conductive track member.

7. The system of claim 5, wherein said brush and said rod are conductive.

8. A system for transferring cartridges, comprising:
a frame assembly having a first groove;
a first conductive member attached to a first surface of said frame assembly and extending through said first groove;
a movable cartridge access device detachably coupled to a cartridge; and
a first engaging member coupled to said cartridge access device and engaged with said first conductive member, said first engaging member comprised of conductive material, said first engaging member further comprised of a spring for pressing and said first engaging member against said first conductive member.

9. The system of claim 8, wherein said system is a data storage system.

10. The system of claim 8, wherein said frame assembly has a second groove and said system further comprises:
a second conductive member attached to a second surface of said frame assembly and extending through said second groove; and
a second engaging member coupled to said cartridge access device and engaged with said second conductive member, said second engaging member comprised of conductive material.

11. The system of claim 10, wherein said first conductive member has a voltage different than a voltage of said second conductive member.

12. The system of claim 10, further comprising:
means for sliding said first engaging member across said first conductive member as said cartridge access device moves; and
means for sliding said second engaging member across said second conductive member as said cartridge access device moves.

13. The system of claim 10, wherein said first conductive member continuously extends through said first groove and said second conductive member continuously extends through said second groove.

14. The system of claim 8, wherein said first engaging member further comprises a brush engaged with said first conductive member.

15. A system for transferring cartridges, comprising:
a frame assembly having a first groove;
a first conductive member attached to a first surface of said frame assembly and extending through said first groove;
a movable cartridge access device detachably coupled to a cartridge; and
a first engaging member coupled to said cartridge access device and engaged with said first conductive member, said first engaging member comprised of conductive material,
wherein said first engaging member comprises:
a shaft having a hollow region;
a brush engaged with said first conductive member;
a rod coupled to said brush and inserted into said hollow region; and
a spring coupled to said rod and engaged with said shaft.

16. The system of claim 15, wherein said brush is conductive.

17. The system of claim 16, wherein a force generated by said spring pushes said brush toward said first conductive member.

18. A method for transferring data cartridges within a cartridge storage system, comprising the steps of:
providing a frame assembly having a conductive track member extending across a surface of said frame assembly;
providing a cartridge access device having a conductive member;
inserting a cartridge into said cartridge access device;
moving said cartridge access device relative to said frame assembly;
sliding said conductive member across said conductive track member during said moving step, said conductive member coupled to a spring for pressing said conductive member against conductive track member; and
supplying a power signal to said cartridge access device through said conductive track member and said conductive member of said cartridge access device.

19. The method of claim 18, wherein said conductive track member extends through a groove of said frame assembly, and wherein said moving step further comprises the step of moving said conductive member of said cartridge access device through said groove.

20. The method of claim 18, wherein said conductive member of said cartridge access device comprises:
a shaft having a hollow region;
a brush engaged with said first conductive member; and
a rod coupled to said brush and inserted into said hollow region,
wherein said spring is coupled to said rod and engaged with said shaft.

21. The method of claim 18, wherein said conductive member of said cartridge access device includes a brush engaged with said conductive track member.

22. The method of claim 21, wherein said brush is coupled to a spring for pressing said brush against said conductive track member.

23. A method for transferring data cartridges within a cartridge storage system, comprising the steps of:
providing a frame assembly having a conductive track member extending across a surface of said frame assembly;
providing a cartridge access device having a conductive member;
inserting a cartridge into said cartridge access device;
moving said cartridge access device relative to said frame assembly;
sliding said conductive member across said conductive track member during said moving step;
supplying a combined power and control signal to said cartridge access device through said conductive track member and said conductive member of said cartridge access device;
filtering a power signal and a control signal from said combined power and control signal; and
controlling movement of said cartridge access device via said control signal.

24. A method for transferring data cartridges within a cartridge storage system, comprising the steps of:
providing a frame assembly having a conductive track member extending across a surface of said frame assembly;

providing a cartridge access device having a conductive brush;

inserting a cartridge into said cartridge access device;

moving said cartridge access device relative to said frame assembly;

sliding said conductive brush across said conductive track member during said moving step; and supplying a power signal to said cartridge access device through said conductive track member and said conductive brush of said cartridge access device, wherein said conductive brush is coupled to a spring for pressing said conductive brush against said conductive track member.

25. A system for transferring data cartridges, comprising:

a frame assembly having a conductive track member extending across a surface of said frame assembly; and a cartridge access device for moving cartridges relative to said frame assembly, said cartridge access device having a conductive member, a filter, and control logic, said conductive member engaged with said conductive track member for receiving a combined power and control signal from said conductive track member as said cartridge access device moves relative to said frame assembly, said filter for filtering a power signal and a control signal from said combined power and control signal, said control logic for moving said cartridge access device relative to said frame assembly in response to said control signal.

26. The system of claim 25, wherein said conductive member is coupled to a spring for pressing said conductive member against said conductive track member.

27. The system of claim 25, wherein said conductive member comprises a brush engaged with said conductive track member.

* * * * *